(12) United States Patent
Savidge et al.

(10) Patent No.: US 11,560,212 B2
(45) Date of Patent: Jan. 24, 2023

(54) SYSTEM FOR OPERATING AN AIRCRAFT DOOR

(71) Applicant: BOMBARDIER INC., Dorval (CA)

(72) Inventors: John Richard Savidge, Sooke (CA); Peter Lyver, Beaconsfield (CA); Jean-Philippe Demers, Verdun (CA); David Riviere, Laval (CA); Remi Crozier, Montréal (CA); Goran Kalaba, Montréal (CA); Patrick Serres, Montréal (CA)

(73) Assignee: BOMBARDIER INC., Dorval (CA)

( * ) Notice: Subject to any disclaimer, the term of this patent is extended or adjusted under 35 U.S.C. 154(b) by 391 days.

(21) Appl. No.: 16/705,438

(22) Filed: Dec. 6, 2019

(65) Prior Publication Data

US 2020/0181956 A1     Jun. 11, 2020

Related U.S. Application Data

(60) Provisional application No. 62/783,361, filed on Dec. 21, 2018, provisional application No. 62/776,735, filed on Dec. 7, 2018.

(51) Int. Cl.
| | |
|---|---|
| *B64C 1/14* | (2006.01) |
| *E05C 3/00* | (2006.01) |
| *E05C 3/08* | (2006.01) |
| *B64C 1/24* | (2006.01) |

(52) U.S. Cl.
CPC ............ *B64C 1/1423* (2013.01); *E05C 3/006* (2013.01); *E05C 3/08* (2013.01); *B64C 1/24* (2013.01)

(58) Field of Classification Search
CPC .......... Y10T 292/1039; Y10T 292/104; Y10T 292/1041; Y10T 292/1043; Y10T 292/1075; Y10T 292/1076; Y10T 292/1078; B64C 1/1415; B64C 1/1423; B64C 1/143; B64C 1/1461; E05C 3/006; E05C 3/08; E05C 17/46
See application file for complete search history.

(56) References Cited

U.S. PATENT DOCUMENTS

| | | | | |
|---|---|---|---|---|
| 3,004,303 | A * | 10/1961 | Wilmer | ..................... B64C 1/14 49/249 |
| 3,791,073 | A * | 2/1974 | Baker | ................... B64C 1/1407 49/40 |
| 4,510,714 | A | 4/1985 | Kasper et al. | |
| 4,560,123 | A | 12/1985 | Sealey et al. | |
| 5,305,969 | A * | 4/1994 | Odell | .................... B64C 1/1407 292/259 R |

(Continued)

*Primary Examiner* — Joshua J Michener
*Assistant Examiner* — Ka Chun Leung
(74) *Attorney, Agent, or Firm* — Norton Rose Fulbright Canada LLP

(57) ABSTRACT

Systems and methods for operating an aircraft door including an airstair are disclosed. In one embodiment, the system includes a hinge configured to pivotally couple a lower portion of the door to a fuselage of an aircraft, a lift mechanism and an interlock. The lift mechanism causes a movement of the door relative to the hinge between a lowered position and a lifted position. The interlock is configurable between: a locked configuration where the movement of the door relative to the hinge is prevented; and an unlocked configuration where the movement of the door relative to the hinge is permitted.

18 Claims, 13 Drawing Sheets

(56) References Cited

U.S. PATENT DOCUMENTS

| | | | |
|---|---|---|---|
| 5,337,977 A | 8/1994 | Fleming et al. | |
| 5,667,169 A * | 9/1997 | Erben | B64C 1/143 244/129.4 |
| 8,201,777 B2 | 6/2012 | Wilson et al. | |
| 2003/0006343 A1 * | 1/2003 | Senger | B64C 1/143 244/129.5 |
| 2015/0292254 A1 * | 10/2015 | Bessettes | E05F 15/70 49/31 |

* cited by examiner

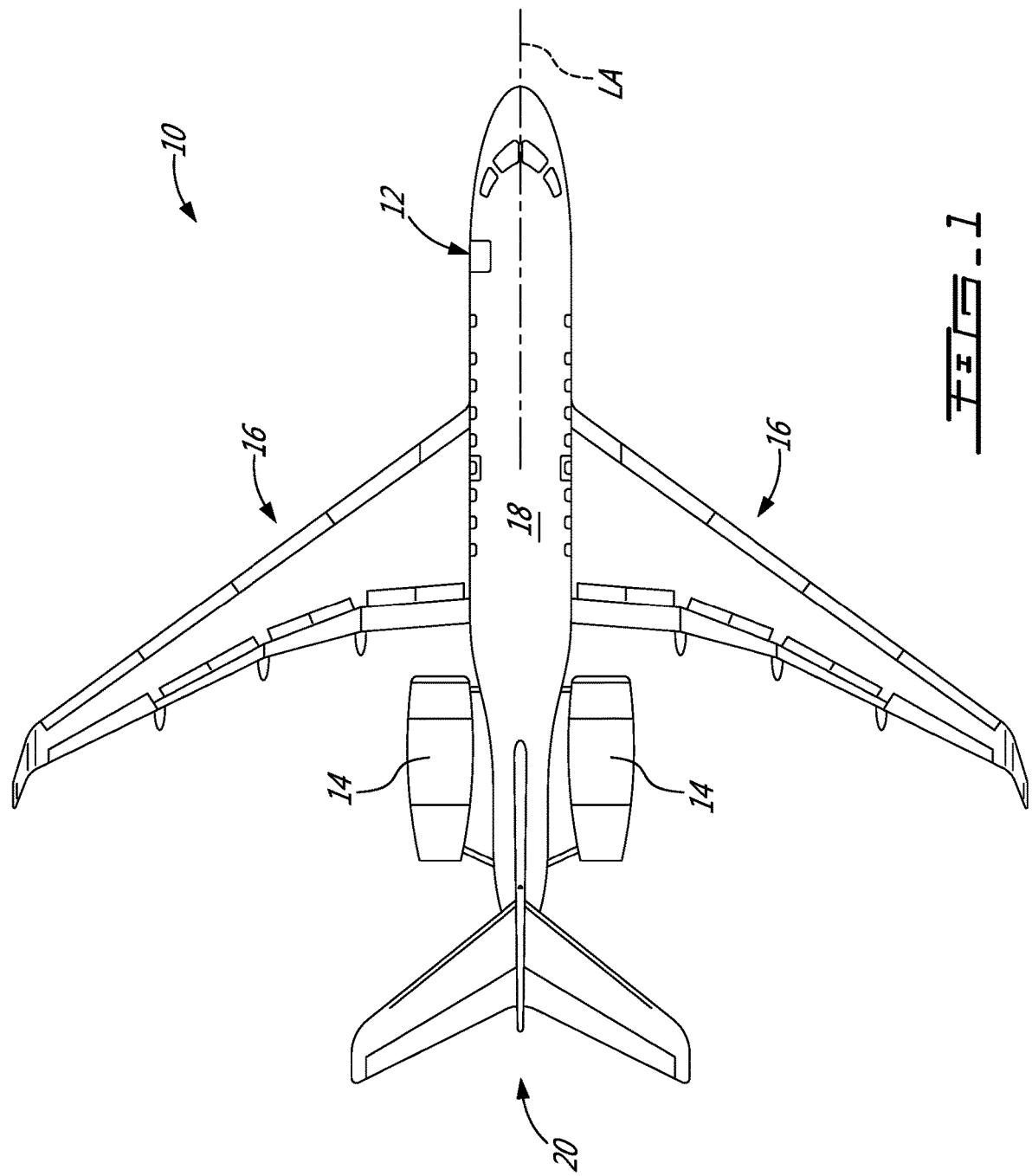

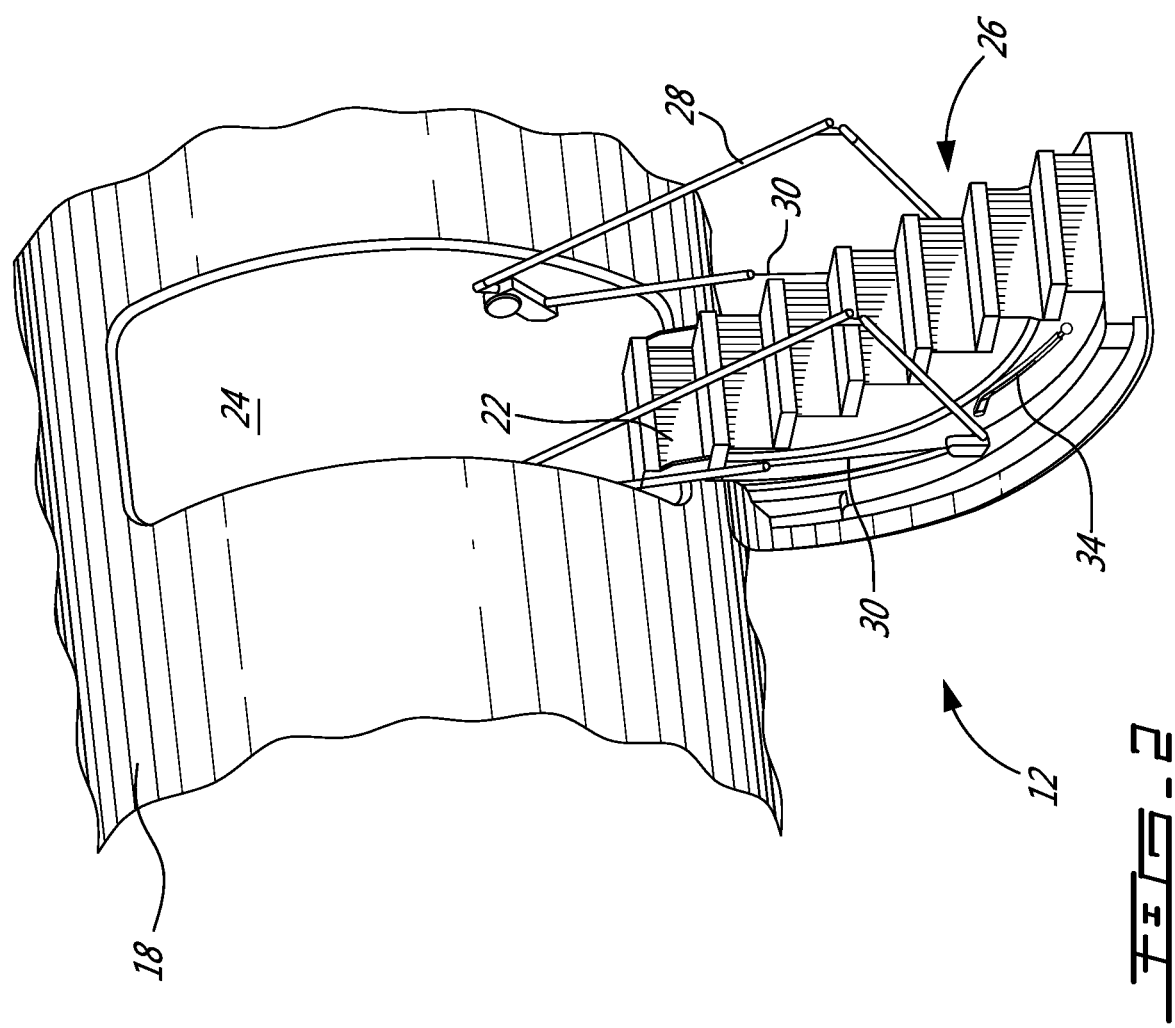

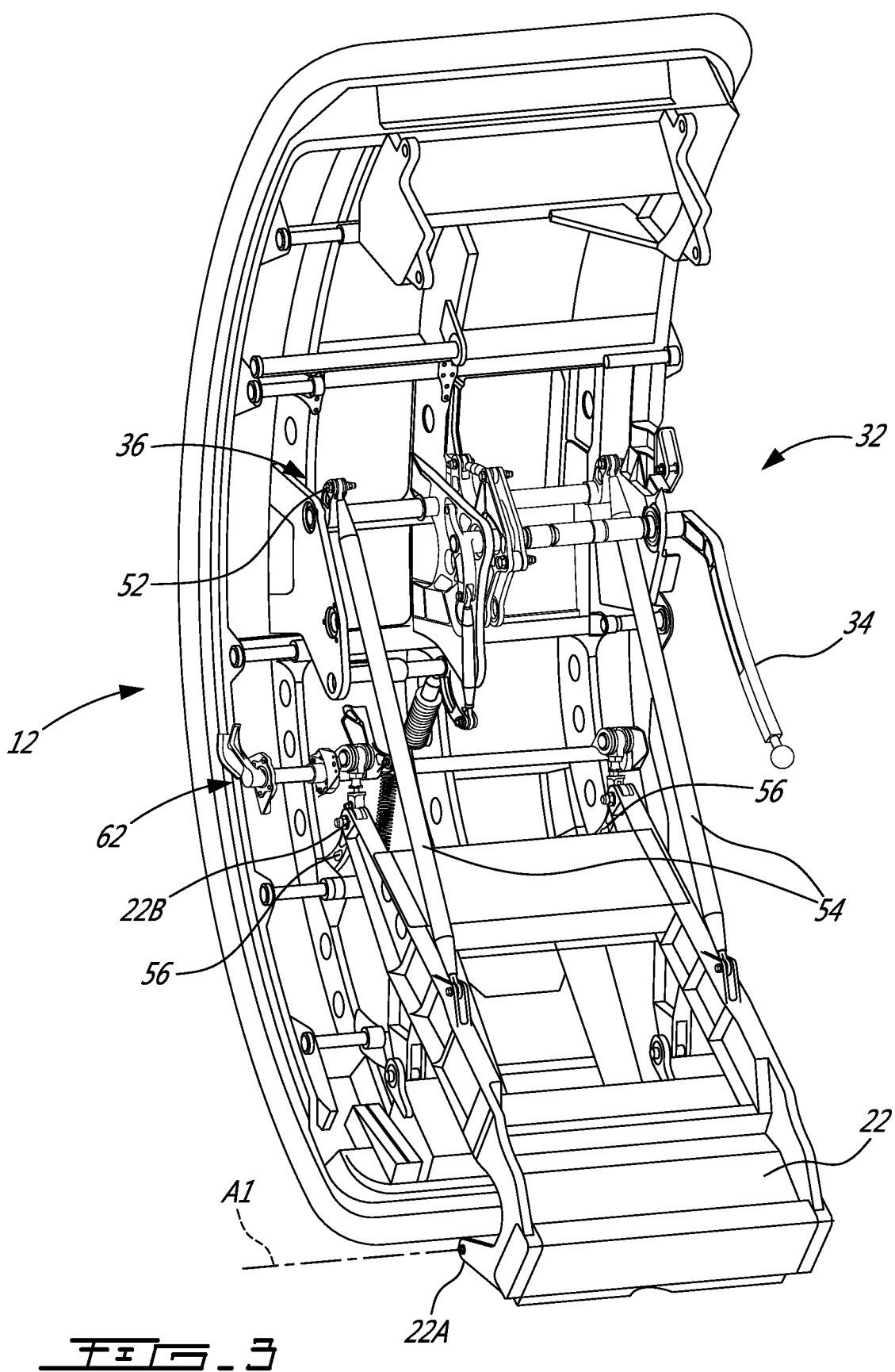
FIG_3

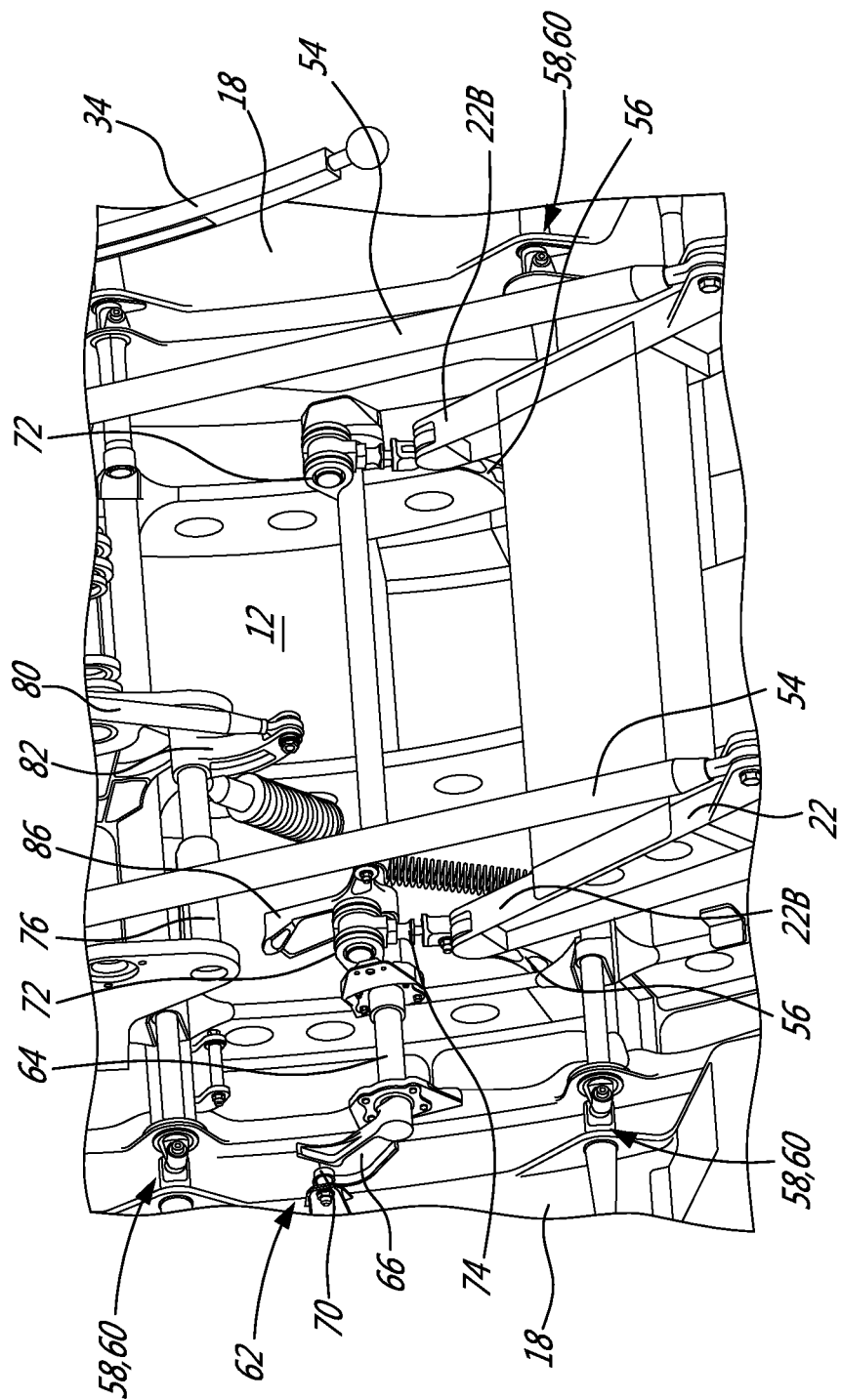

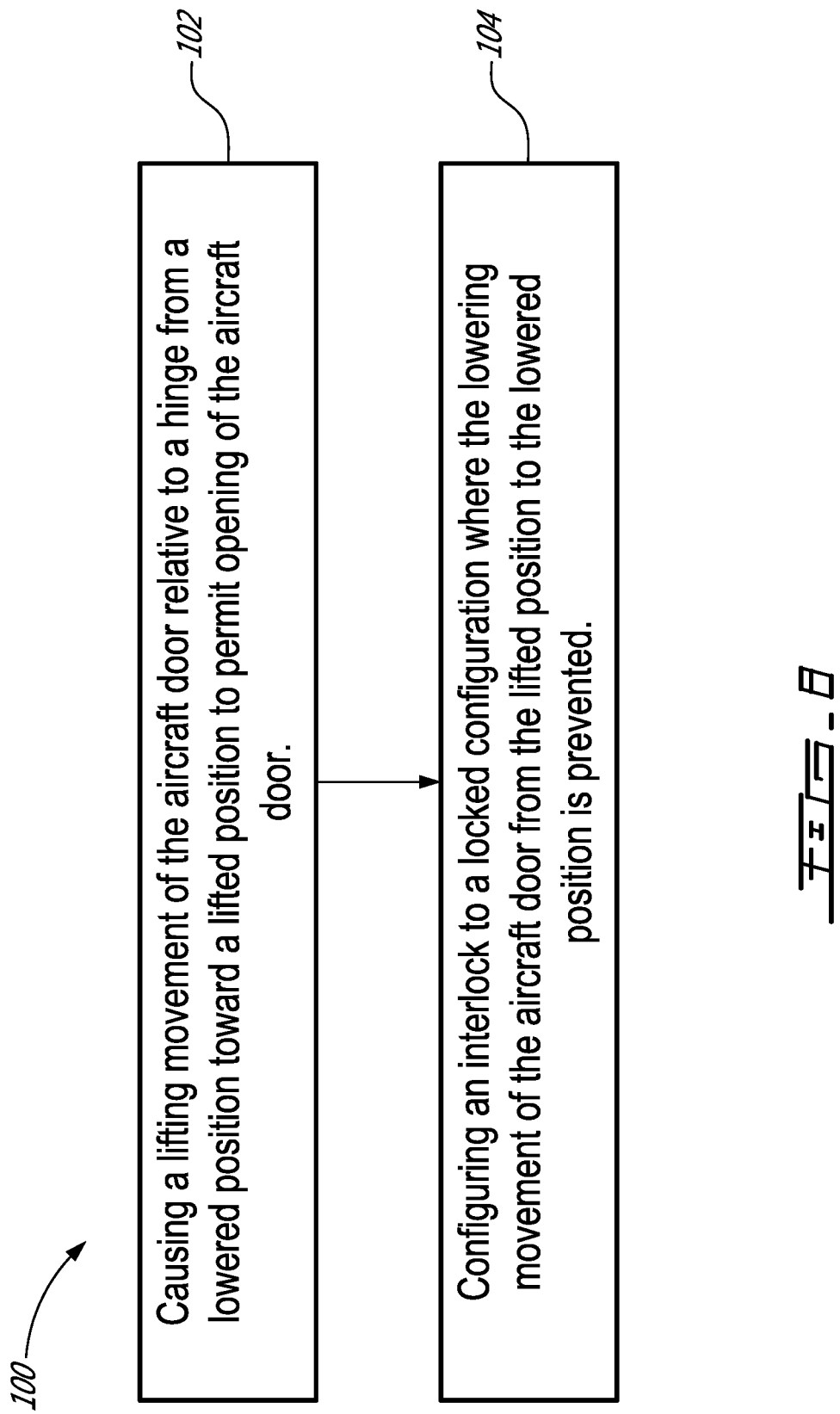

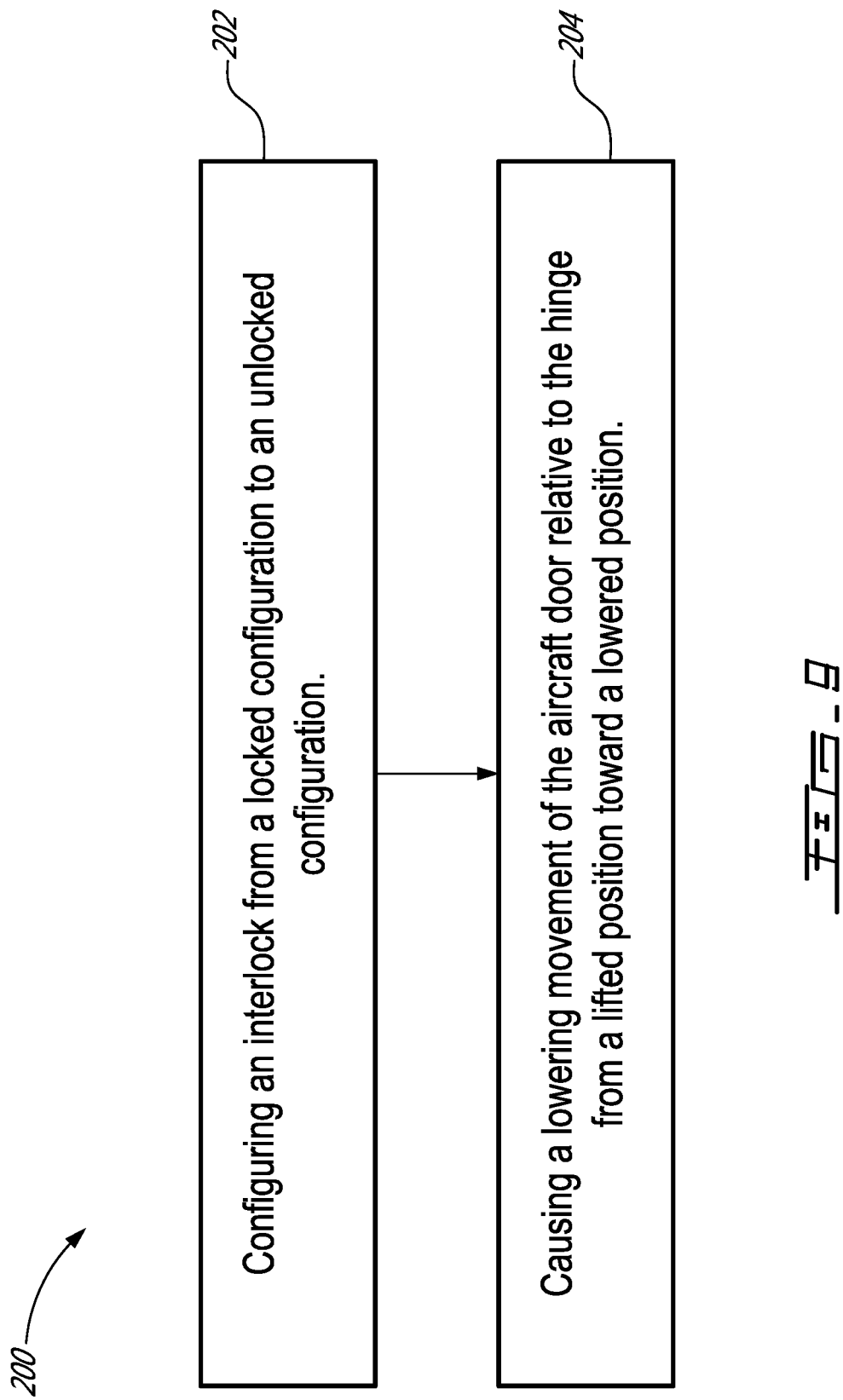

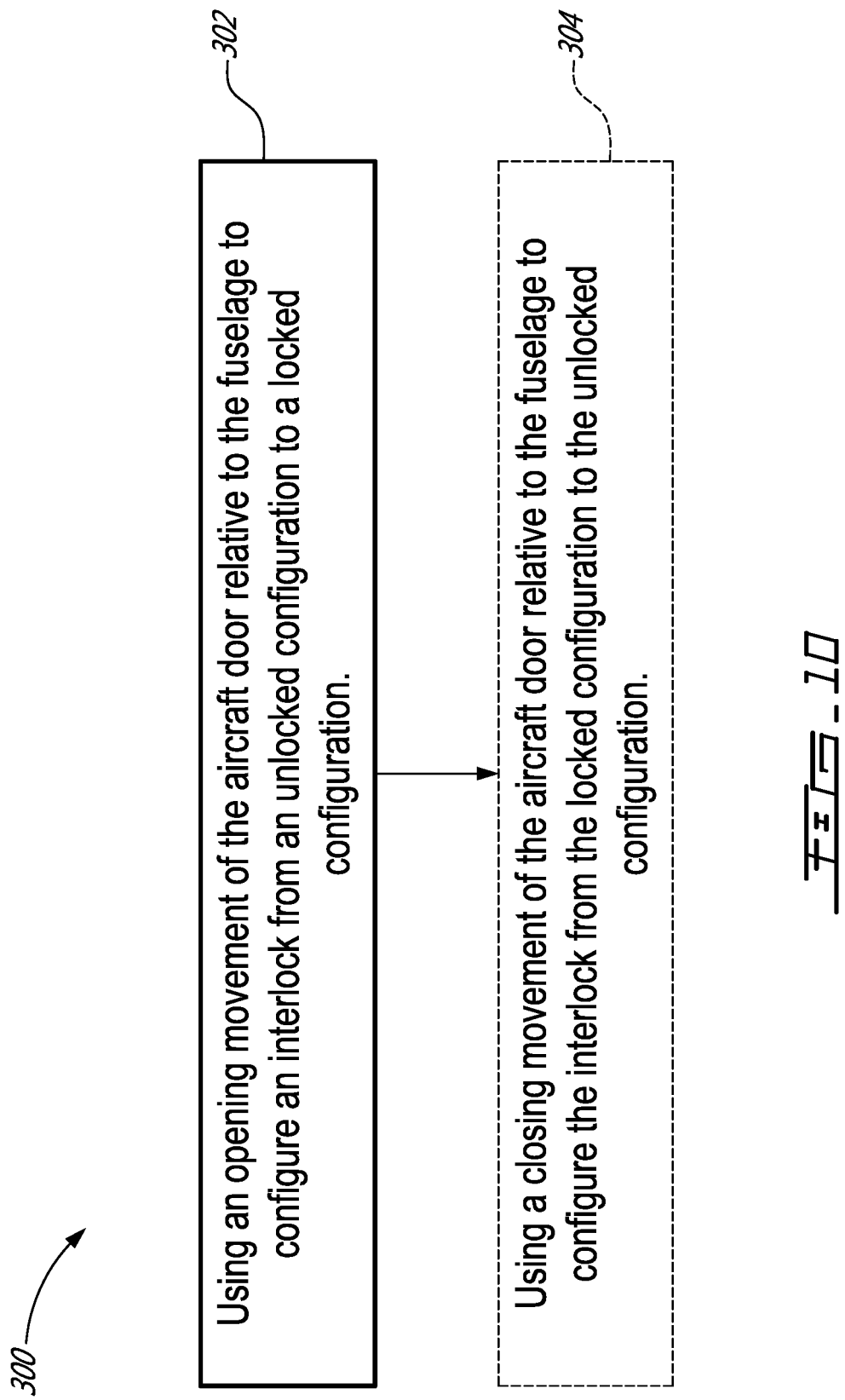

SYSTEM FOR OPERATING AN AIRCRAFT DOOR

CROSS REFERENCE TO RELATED APPLICATIONS AND CLAIM OF PRIORITY

This application relies for priority on U.S. Provisional Patent Application Ser. Nos. 62/776,735 and 62/783,361 filed on Dec. 7, 2018 and on Dec. 21, 2018 respectively, the entire contents of both of which are incorporated herein by reference.

TECHNICAL FIELD

The disclosure relates generally to aircraft, and more particularly to aircraft doors.

BACKGROUND

Some aircraft have a built-in set of stairs called an "airstair" that permits passengers to board and exit the aircraft. An airstair can be built into an interior side of a clamshell-style door that is pivotally coupled to a fuselage of the aircraft. An airstair can eliminate the need for passengers to use a mobile stairway or jet bridge to board or exit the aircraft. Even though existing airstairs are designed to safely support the weight of one or more passengers boarding or exiting aircraft, some airstairs provide a foothold that appear to lack in firmness and stability.

Aircraft doors include latching elements that are configured to take loads during flight. On some aircraft, the latching elements can be actuated via a handle that facilitates the opening and closing of the aircraft door by the flight crew. Such aircraft door handles typically have a door-open position corresponding to when the door is unlatched and open and a door-closed position corresponding to when the door is closed and latched. If the handle is moved to its door-closed position prematurely while the door is still open, then attempting to close the door while the handle is already in its door closed position could results in clashing of latching elements. Improvement is desirable.

SUMMARY

In one aspect, the disclosure describes a system for operating an aircraft door including an airstair. The system comprises:

a hinge configured to pivotally couple a lower portion of the aircraft door to a fuselage of an aircraft;

a lift mechanism operatively coupled to cause a movement of the aircraft door relative to the hinge between a lowered position where opening and closing of the aircraft door is prevented and a lifted position were opening and closing of the aircraft door is permitted; and an interlock configurable between: a locked configuration where the movement of the aircraft door from the lifted position toward the lowered position relative to the hinge is prevented; and an unlocked configuration where the movement of the aircraft door from the lifted position toward the lowered position relative to the hinge is permitted.

The system may comprise a handle drivingly coupled to the lift mechanism so that:

a movement of the handle toward a door-open position causes a movement of the aircraft door toward the lifted position; and a movement of the handle toward a door-closed position causes a movement of the aircraft door toward the lowered position.

The interlock may prevent the movement of the handle toward the door-closed position when the interlock is in the locked configuration. The interlock may permit the movement of the handle toward the door-closed position when the interlock is in the unlocked configuration.

The interlock may include a lock shaft rotatably supported on the aircraft door. The lock shaft may be rotatable between a locked position corresponding to the locked configuration of the interlock and an unlocked position corresponding to the unlocked configuration of the interlock. A rotation of the lock shaft may be driven by a movement of the aircraft door relative to the fuselage.

An opening movement of the aircraft door may cause the rotation of the lock shaft toward the locked position. A closing movement of the aircraft door may cause the rotation of the lock shaft toward the unlocked position.

The system may comprise:

an arm attached to the lock shaft and rotatable with the lock shaft; and a guide attached to the fuselage, the guide being configured and disposed to interact with the arm during movement of the aircraft door relative to the fuselage and cause a rotation of the arm.

The arm may define a cam surface. The guide may include a roller configured to interact with the cam surface of the arm.

The system may comprise an intermediate shaft drivingly coupled to the handle. The interlock may interfere with a rotation of the intermediate shaft when the interlock is in the locked configuration.

The system may comprise:

an intermediate pawl attached to the intermediate shaft and rotatable with the intermediate shaft; and a lock pawl attached to the lock shaft and rotatable with the lock shaft, the lock pawl interfering with a rotation of the intermediate pawl when the interlock is in the locked configuration.

The hinge may be pivotally coupled to a hinge link. The hinge link may be pivotally coupled to the aircraft door. The interlock may interfere with a movement of the hinge link when the interlock is in the locked configuration.

The hinge may be pivotally coupled to a hinge link. The hinge link may be pivotally coupled to the aircraft door.

The system may comprise:

a lock crank attached to the lock shaft and rotatable with the lock shaft; and a lock link having a first end coupled to the lock crank and a second end coupled to the hinge link so that a rotation of the hinge link is prevented when the lock shaft is in the locked position.

The lock link may have a length variable between a short length and a long length. The lock link may have the short length when the lock shaft is in the locked position.

The system may comprise:

a rotatable handle shaft drivingly coupled to the handle so that a movement of the handle causes a rotation of the handle shaft;

a rotatable lift shaft rotatably supported on the aircraft door and drivingly coupled to the handle shaft so that the rotation of the handle shaft causes a rotation of the lift shaft; and one or more lift rods drivingly coupled to the lift shaft and to the hinge so that a rotation of the lift shaft causes the movement of the aircraft door relative to the hinge via the lift rods.

The interlock may be configurable between the unlocked and locked configurations in response to a movement of the aircraft door relative to the fuselage.

Embodiments can include combinations of the above features.

In another aspect, the disclosure describes a method for operating an aircraft door including an airstair where a lower portion of the aircraft door is pivotally coupled to a fuselage of an aircraft via a hinge. The method comprises:

causing a lifting movement of the aircraft door relative to the hinge from a lowered position toward a lifted position to permit opening of the aircraft door; and then configuring an interlock to a locked configuration where a lowering movement of the aircraft door relative to the hinge from the lifted position to a lowered position is prevented.

The method may comprise using a movement of a handle toward a door-open position to cause the lifting movement of the aircraft door.

The interlock may prevent the movement of the handle toward a door-closed position when the interlock is in the locked configuration.

The method may comprise using an opening movement of the aircraft door to configure the interlock to the locked configuration.

The method may comprise configuring the interlock from the locked configuration to an unlocked configuration where the movement of the aircraft door from the lifted position toward the lowered position relative to the hinge is permitted.

The method may comprise:

configuring the interlock from the locked configuration to an unlocked configuration where the movement of the aircraft door from the lifted position toward the lowered position relative to the hinge is permitted; and using a movement of the handle toward the door-closed position to cause a lowering movement of the aircraft door relative to the hinge from the lifted position toward the lowered position.

The method may comprise using a closing movement of the aircraft door to configure the interlock from the locked configuration to the unlocked configuration.

The method may comprise using a guide attached to the fuselage to configure the interlock.

The method may comprise using the guide to cause a rotation of a lock shaft of the interlock.

The interlock may interfere with a rotation of an intermediate shaft when the interlock is in the locked configuration. The intermediate shaft may be drivingly coupled to a handle shaft. The handle shaft may be drivingly coupled to the handle.

The interlock may interfere with a rotation of a shaft drivingly coupled to the handle when the interlock is in the locked configuration.

Embodiments can include combinations of the above features.

In a further aspect, the disclosure describes a method for operating an aircraft door including an airstair where a lower portion of the aircraft door is pivotally coupled to a fuselage of an aircraft via a hinge. The method comprises:

configuring an interlock from a locked configuration where a lowering movement of the aircraft door relative to the hinge from a lifted position to a lowered position is prevented, to an unlocked configuration where the lowering movement of the aircraft door relative to the hinge from the lifted position to the lowered position is permitted; and then causing the lowering movement of the aircraft door relative to the hinge from the lifted position toward the lowered position.

The method may comprise using a movement of a handle toward a door-closed position to cause the lowering movement of the aircraft door.

The interlock may prevent the movement of the handle toward the door-closed position when the interlock is in the locked configuration. The interlock may permit the movement of the handle toward the door-closed position when the interlock is in the unlocked configuration.

The method may comprise using a closing movement of the aircraft door to configure the interlock from the locked configuration to the unlocked configuration.

The method may comprise using a guide attached to the fuselage to configure the interlock.

The method may comprise using the guide to cause a rotation of a lock shaft of the interlock.

Embodiments can include combinations of the above features.

In a further aspect, the disclosure describes a system for operating an aircraft door including an airstair. The system comprises:

a hinge configured to pivotally couple a lower portion of the aircraft door to a fuselage of an aircraft;

a handle configured to facilitate an opening of the aircraft door, the handle being movable between a door-closed position and a door-open position; and an interlock configurable between an unlocked configuration and a locked configuration in response to a movement of the aircraft door relative to the fuselage, wherein:

a movement of the handle toward the door-closed position is permitted when the interlock is in the unlocked configuration; and the movement of the handle toward the door-closed position is prevented when the interlock is in the locked configuration.

The interlock may include a lock shaft rotatably supported on the aircraft door. The lock shaft may be rotatable between a locked position corresponding to the locked configuration of the interlock and an unlocked position corresponding to the unlocked configuration of the interlock. A rotation of the lock shaft may be driven by the movement of the aircraft door relative to the fuselage.

An opening movement of the aircraft door may cause the rotation of the lock shaft toward the locked position.

The system may comprise:

an arm attached to the lock shaft and rotatable with the lock shaft; and a guide attached to the fuselage, the guide being configured and disposed to interact with the arm during movement of the aircraft door relative to the fuselage and cause a rotation of the arm.

The arm may define a cam surface. The guide may include a roller configured to interact with the cam surface of the arm.

The system may comprise:

a handle shaft drivingly coupled to the handle; and an intermediate shaft drivingly coupled to the handle shaft, wherein the interlock interferes with a rotation of the intermediate shaft when the interlock is in the locked configuration.

The system may comprise an intermediate pawl attached to the intermediate shaft and rotatable with the intermediate shaft. The interlock may interfere with a rotation of the intermediate pawl when the interlock is in the locked configuration.

Embodiments can include combinations of the above features.

In a further aspect, the disclosure describes a method for operating an aircraft door including an airstair where a lower portion of the aircraft door is pivotally coupled to a fuselage of an aircraft via a hinge. The method comprises:

after a movement of a handle configured to facilitate an opening of the aircraft door toward a door-open position, using an opening movement of the aircraft door relative to the fuselage to configure an interlock from an unlocked configuration where a movement of the handle toward the door-closed position is permitted, to a locked configuration where the movement of the handle toward the door-closed position is prevented.

The method may comprise using a closing movement of the aircraft door relative to the fuselage to configure the interlock from the locked configuration to the unlocked configuration.

The method may comprise using a guide attached to the fuselage to configure the interlock between the unlocked configuration and the locked configuration.

Embodiments can include combinations of the above features.

In a further aspect, the disclosure describes an aircraft comprising a system as described herein.

Further details of these and other aspects of the subject matter of this application will be apparent from the detailed description included below and the drawings.

DESCRIPTION OF THE DRAWINGS

Reference is now made to the accompanying drawings, in which:

FIG. 1 is a top plan view of an exemplary aircraft comprising a door as described herein;

FIG. 2 is a perspective view of a portion of a fuselage of the aircraft of FIG. 1 with an exemplary door in the open position;

FIG. 3 is a perspective view of part of the door of FIG. 2 when the door is in the closed position and showing an exemplary system for operating the door;

FIG. 4B is an enlarged perspective view of another part of the system of FIG. 3;

FIG. 8 is a flowchart of a method for operating an aircraft door;

FIG. 9 is a flowchart of another method for operating an aircraft door; and

FIG. 10 is a flowchart of a further method for operating an aircraft door.

DETAILED DESCRIPTION

Figure 4A:
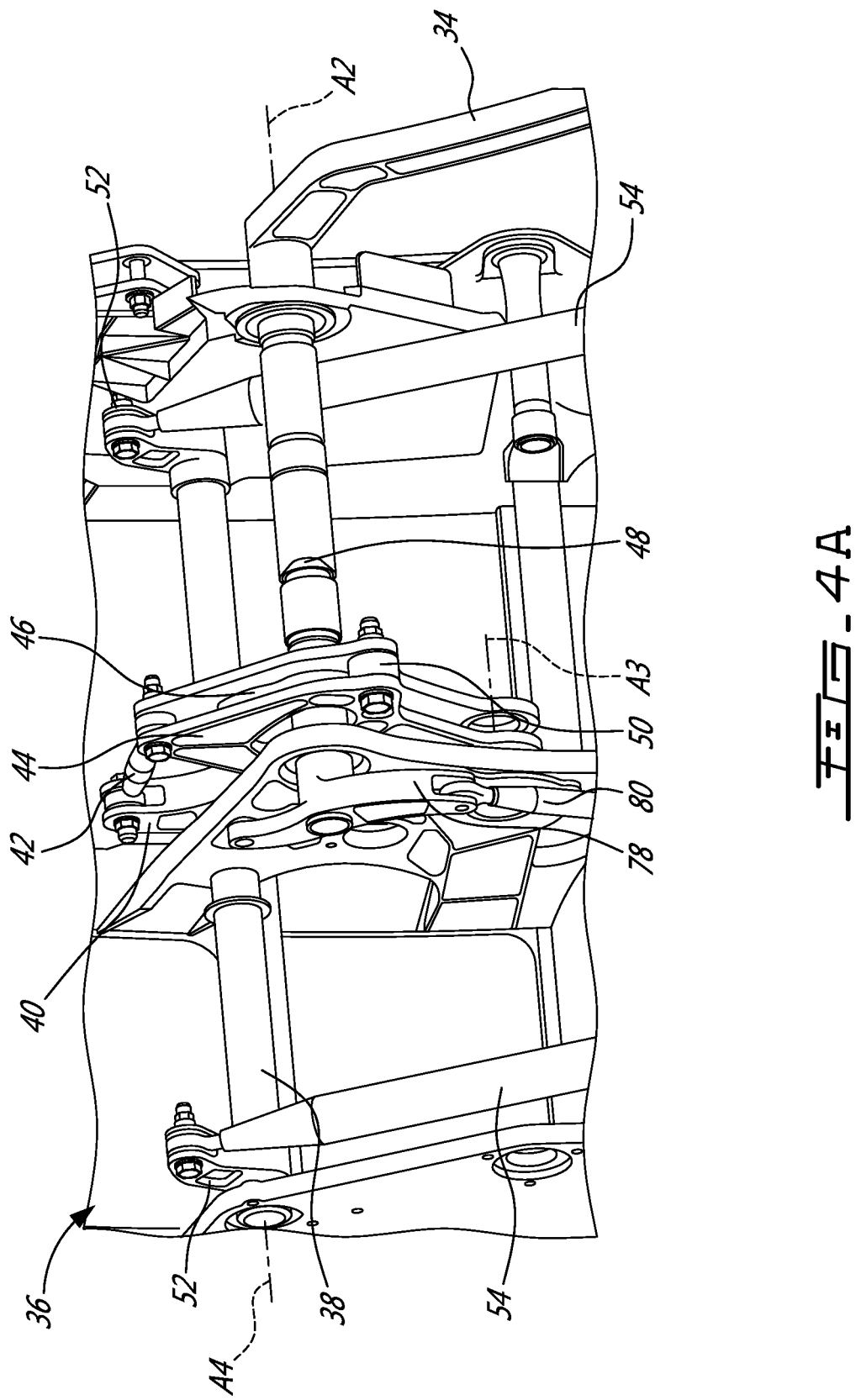
FIG. 4A is an enlarged perspective view of part of the system of FIG. 3.

In various embodiments, the systems and methods described herein can improve the construction and operation of passenger doors of aircraft. For example, the systems and methods disclosed herein can, in some embodiments, improve the firmness and stability of airstairs. In some embodiments, the systems and methods described herein can, instead or in addition, prevent a handle of an aircraft door from being prematurely moved to its door-closed position until the door is properly positioned relative to the fuselage of the aircraft so that inadvertent clashing of latching and/or other elements can be avoided.

In some embodiments, the systems disclosed herein can be used with "semi-plug" type doors that include an airstair and that require lifting during an initial opening stage of the door in order to permit door pressure stops on the door to move past corresponding fuselage pressure stops on the fuselage and consequently permit opening of the door. As explained further below, the door pressure stops on the door rest against the fuselage pressure stops on the fuselage and the pressure differential between the interior and exterior of the aircraft securely holds the door pressure stops against the fuselage pressure stops so that, in the event of a failure of a latching mechanism of the door during flight, the pressurization of the aircraft would hold the door in place. Embodiments of the systems and methods disclosed herein are not limited to semi-plug doors that require lifting/lowering.

Aspects of various embodiments are described through reference to the drawings.

FIG. 1 is a top plan view of an exemplary aircraft 10 which can comprise passenger door 12 with integrated stairs (i.e., an airstair). Aircraft 10 can be a fixed-wing aircraft comprising one or more engines 14. Aircraft 10 can comprise wings 16, fuselage 18 and empennage 20. Aircraft 10 can be any type of aircraft such as corporate, private, commercial and passenger aircraft suitable for civil aviation. For example, aircraft 10 can be a (e.g., ultra-long range) business jet, a twin-engine turboprop airliner or a regional jet airliner. Aircraft 10 can have longitudinal axis LA corresponding to a centerline of fuselage 18.

FIG. 2 is a perspective view of a portion of fuselage 18 with door 12 of aircraft 10 shown in an open position. Door 12 can be a clamshell type door. Door 12 can be a semi-plug door that requires lifting to permit opening of door 12. A lower portion of door 12 can be pivotally coupled to fuselage 18 of aircraft 10 via hinge 22 disposed at a lower portion of opening 24 formed into fuselage 18. Door 12 can have an interior side facing an interior (e.g., passenger cabin) of aircraft 10 when door 12 is closed and an exterior side (e.g., outer skin) facing an exterior of aircraft 10 when door 12 is closed. The interior side of door 12 can define airstair 26 permitting passengers to board and exit aircraft 10 when door 12 is open. Airstair 26 can include one or more steps. Aircraft 10 can include deployable handrail 28 associated with airstair 26. Handrail 28 can be movable between a stowed configuration when door 12 is closed to a deployed configuration when door 12 is open. The movement of handrail 28 can be coordinated with the opening/closing movement (e.g., rotation) of door 12.

In some embodiments, door 12 can be configured so that the opening and closing of door 12 can be initiated manually either by the flight crew from the interior of aircraft 10 (e.g., via handle 34) or by the ground crew from the exterior of aircraft 10 (e.g., via an external handle). In some embodiments door 12 can be coupled to an assist mechanism configured to reduce an amount of force required to manually move door 12 between its open and closed positions. In some embodiments, door 12 can be operatively coupled to one or more electric motors that can facilitate the opening and/or closing of door 12 for example. Such motor(s) can be mounted to fuselage 18 and drivingly coupled to door 12 via cable(s) 30 and pulley(s).

FIG. 3 is a perspective view of door 12 and hinge 22 when door 12 is in the closed position showing system 32 for operating door 12. Airstair 26 is not shown in FIG. 3 in order to expose system 32 which can be disposed inside airstair 26 and substantially hidden from view. Hinge 22 can include first portion 22A for pivotally coupling to fuselage 18 and second portion 22B for coupling to door 12. Hinge 22 and door 12 can be rotatable about rotation axis A1 relative to fuselage 18. In some embodiments, rotation axis A1 can be substantially parallel to longitudinal axis LA (shown in FIG. 1) of aircraft 10. Hinge 22 can be movably coupled to door 12 at multiple points. In some embodiments, connections between hinge 22 and door 12 can define a four bar linkage.

FIGS. 4A and 4B are enlarged perspective views of parts of system 32. System 32 can include internal handle 34 and an external handle configured to facilitate opening and closing of door 12 from either an interior or an exterior of aircraft 10 respectively. During opening of door 12, actuation of handle 34 can cause lifting of door 12. During closing of door 12, actuation of handle 34 can cause lowering of door 12. Lowering and lifting of door 12 can be carried out via lift mechanism 36 described further below. Door 12 and/or system 32 can comprise other (e.g., latching and/or locking) mechanisms and components that have been omitted from the figures for clarity. In some embodiments, handle 34 may not necessarily cause (e.g., drive) the lifting and/or lowering of door 12. In some embodiments, the actuation of handle 34 can drive other functions (e.g., latching/unlatching and/or locking/unlocking) associated with door 12.

In some embodiments, handle 34 can be drivingly coupled to lift mechanism 36. Lift mechanism 36 can include a plurality of components working together to achieve lifting and lowering of door 12. For example, lift shaft 38 can be operatively coupled to handle 34 via crank 40, lift command link 42, lift command yoke 44, lift command cam 46 and handle shaft 48. Lift command cam 46 can be attached to handle shaft 48 for common rotation with handle shaft 48. Actuation (e.g., rotation) of handle 34 by the flight crew of aircraft 10 for example can drive a rotation of handle shaft 48 about rotation axis A2.

Lift command cam 46 can define a camming surface that is configured to engage one or more rollers 50 (i.e., followers) that are rotatably attached to lift command yoke 44. The movement of rollers 50 induced via lift command cam 46 can drive a rotational movement of lift command yoke 44 about rotation axis A3. In turn, the rotation of lift command yoke 44 can then drive a movement (e.g., translation) of lift command link 42, which can drive a movement of crank 40 to drive a rotation of lift shaft 38 to cause lifting or lowering of door 12 depending on the direction of movement of handle 34. Lift command link 42 can have a first end pivotally coupled to lift command yoke 44 and a second end pivotally coupled to crank 40. Crank 40 can be attached to lift shaft 38 for common rotation with lift shaft 38. Lift command cam 46 and cooperating rollers 50 can be configured to achieve desired timing of the lifting and lowering functions with respect to the actuation of handle 34.

Lift shaft 38 can have rotation axis A4 which can be different from rotation axis A2 of handle shaft 48. Rotation axis A4 of lift shaft 38 can also be different from rotation axis A3 of lift command yoke 44. In some embodiments, rotation axis A4 of lift shaft 38 and rotation axis A2 of handle shaft 48 can be substantially parallel and spaced apart from each other. Lift shaft 38 can be rotatably supported by door 12.

Lift mechanism 36 can include one or more cranks 52 that are attached to lift shaft 38 for common rotation with lift shaft 38. Cranks 52 can be drivingly coupled to respective lift rods 54. Lift rods 54 can each have a first end that is pivotally coupled to a respective crank 52 and a second end that is pivotally coupled to hinge 22. Accordingly, rotation of cranks 52 with lift shaft 38 can drive a movement (e.g., translation) of respective lift rods 54 and thereby drive a lifting movement of door 12 relative to hinge 22. Second portion 22B of hinge 22 can be coupled to door 12 via one or more hinge links 56. For example each hinge link 56 can have a first end pivotally coupled to hinge 22 and a second end pivotally coupled to a structure of door 12. Accordingly, the actuation of lift rods 54 (e.g., via handle 34) can cause a lifting or lowering movement of door 12 relative to hinge 22 by way of rotation of links 56.

Figure 5B:
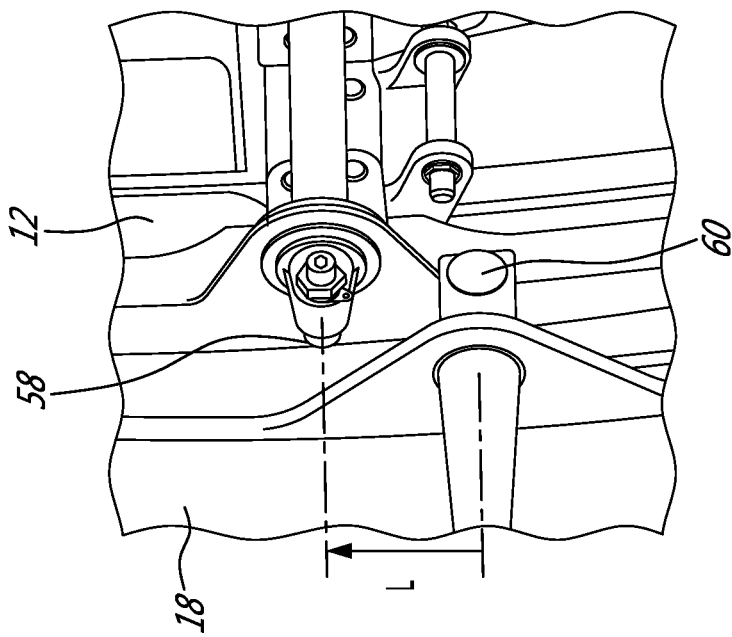
FIGS. 5A and 5B are perspective views of a portion of the door and of the fuselage of the aircraft when the door is lowered and when the door is lifted respectively.
Figure 5A:
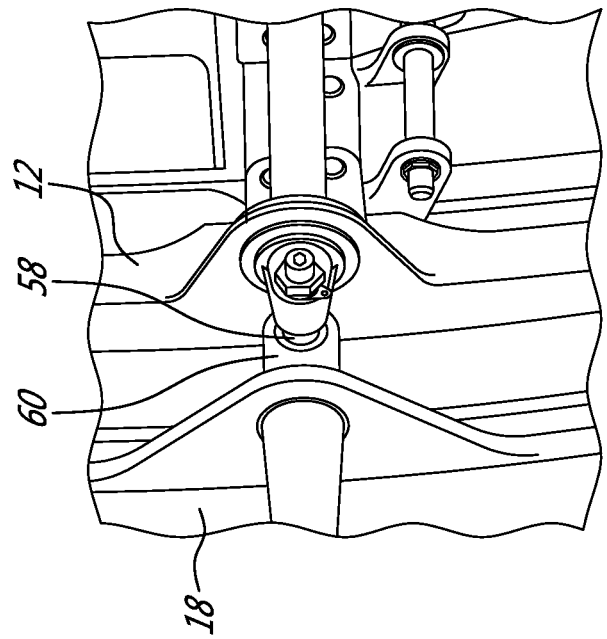

FIGS. 5A and 5B are perspective views of a portion of door 12 and fuselage 18 when door 12 is lowered and when door 12 is lifted respectively. FIG. 5B shows door 12 being lifted by amount L. FIGS. 5A and 5B are from a vantage point that is inside of aircraft 10. As explained above, door 12 can be a semi-plug door that requires lifting during an initial opening stage in order to permit door pressure stops 58 attached to door 12 to clear and move past corresponding fuselage pressure stops 60 attached to fuselage 18 and consequently permit opening of door 12. When door 12 is closed and lowered, door pressure stops 58 and fuselage pressure stops 60 are aligned so that door pressure stops 58 rest against fuselage pressure stops 60 and the pressure differential between the interior and exterior of aircraft 10 causes door 12 to be securely held via door pressure stops 58 and fuselage pressure stops 60. When door 12 is lifted, door pressure stops 58 and fuselage pressure stops 60 are offset from each other so that door pressure stops 58 clear fuselage pressure stops 60 and are free to move outwardly from fuselage 18 so that door 12 can then be opened by pivotal movement of door 12 about axis A1 (shown in FIG. 3). In some embodiments, a plurality of door pressure stops 58 and corresponding fuselage pressure stops 60 can be distributed around door 12.

Figure 6A:
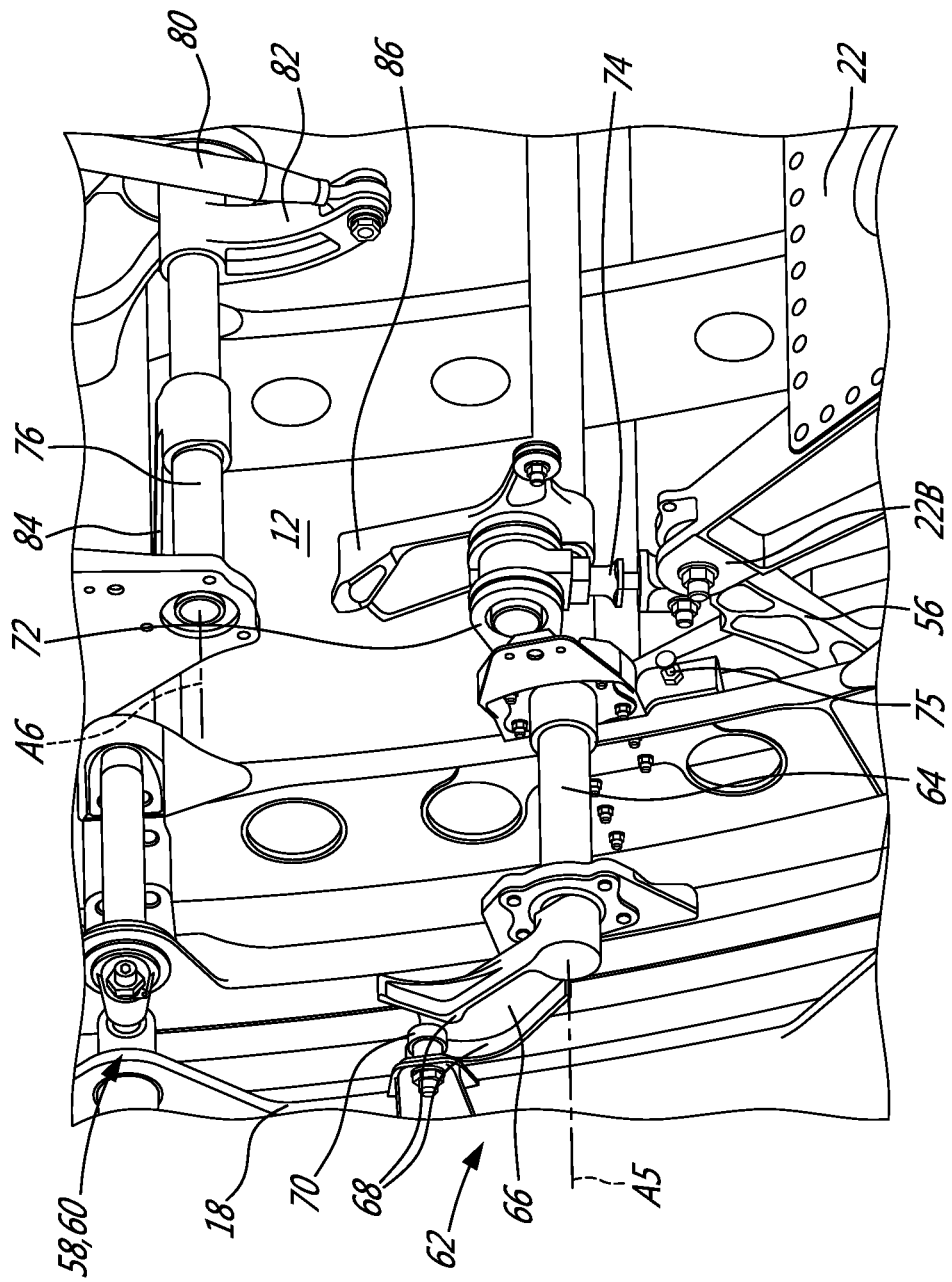
FIG. 6A is a perspective view of an exemplary interlock of the system of FIG. 3 in an unlocked configuration where the door is closed and lowered.
Figure 6B:
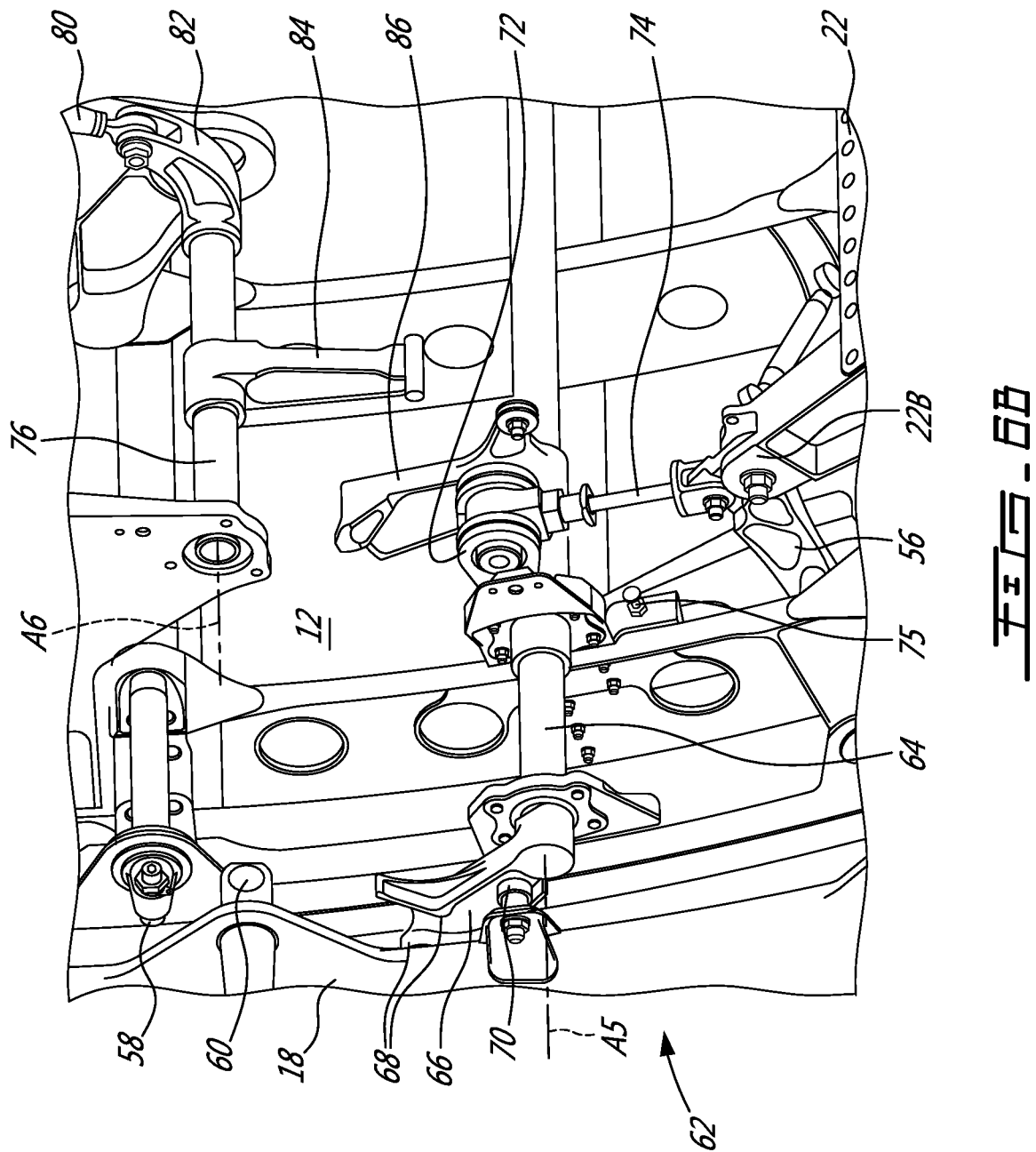
FIG. 6B is a perspective view of the interlock in an unlocked configuration where the door is closed and lifted.
Figure 6C:
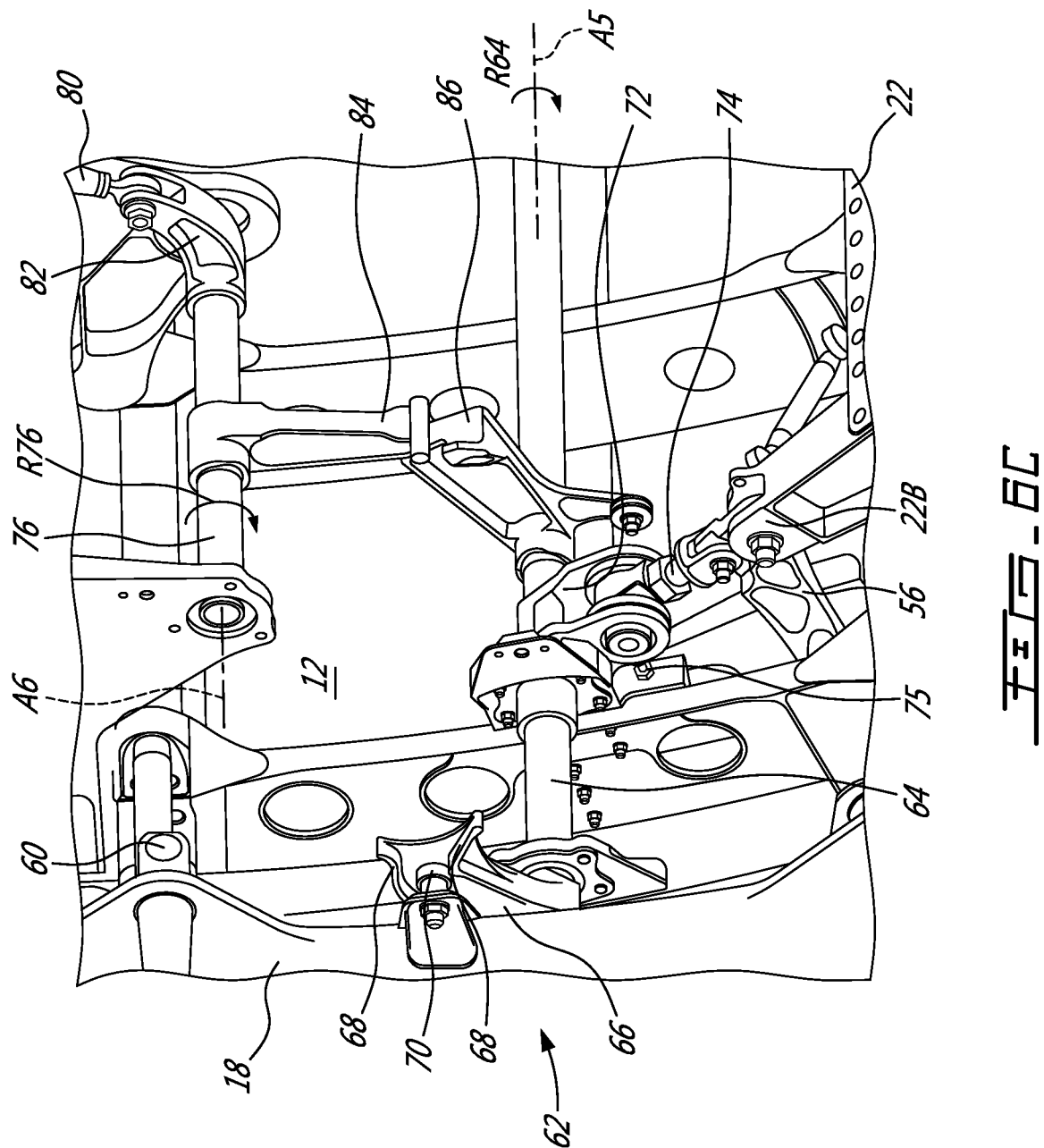
FIG. 6C is a perspective view of the interlock in a locked configuration where the door is lifted and partially open.

FIGS. 6A-6C are perspective views of an exemplary interlock 62 of system 32 in various configurations. FIG. 6A shows interlock 62 in an unlocked configuration where door 12 is closed and in the lowered position where door pressure stops 58 and fuselage pressure stops 60 are aligned. FIG. 6B shows interlock 62 in an unlocked configuration where door 12 is in the lifted position so that door pressure stops 58 are positioned to clear fuselage pressure stops 60 and allow opening or closing of door 12. FIG. 6C shows interlock 62 in a locked configuration where door 12 is in the lifted position and door 12 is partially open. The sequence of events illustrated in FIGS. 6A-6C is intended to illustrate an initial stage of opening door 12 that can be commanded by actuation of handle 34. It is understood that the sequence of events illustrated in FIGS. 6A-6C performed in the reverse order can represent a final stage of closing door 12. Opening of door 12 can be commanded by the actuation of handle 34 in one direction and the closing of door 12 can be commanded by the actuation of handle 34 in the opposite direction.

Interlock 62 can ensure that lift mechanism 36 of door 12 is properly blocked when door 12 is fully lifted to permit the opening and closing movement of door 12 relative to fuselage 18. Accordingly, interlock 62 can prevent relative movement between door 12 and second portion 22B of hinge 22 when door 12 is open and thereby provide firmness and stability to airstair 26 when passengers walk on airstair 26 to board or exit aircraft 10. Instead or in addition, interlock 62 can ensure that one or more (e.g., internal and/or external) handles 34 associated with door 12 are locked (e.g., in a door-open position) when door 12 is open and until door 12 is returned and ready to be fully closed and latched. Preventing handle 34 from prematurely being moved to the door-closed position can prevent clashing of hardware that could otherwise potentially occur while trying to close door 12. In some embodiments, interlock 62 can be configured so that the functions of locking lift mechanism 36 and/or of locking handle 34 can be independent from lift mechanism 36 to avoid de-synchronization due to any deflection in lift mechanism 36 that could potentially occur during opening of door 12 in the event of a residual pressure differential between the interior and the exterior of aircraft 10 for example.

Interlock 62 can be configured between: a locked configuration (e.g., see FIG. 6C) where the movement of door 12 from the lifted position toward the lowered position relative to hinge 22 is prevented; and an unlocked configuration (e.g., see FIGS. 6A and 6B) where the movement of door 12 from the lifted position toward the lowered position relative to hinge 22 is permitted. Interlock 62 can include lock shaft 64 rotatably supported on door 12. Lock shaft 64 can be rotatable about axis A5 between a locked position corresponding to the locked configuration of interlock 62 and an unlocked position corresponding to the unlocked configuration of interlock 62.

Rotation of lock shaft 64 can be driven by the opening/closing movement of door 12 relative to fuselage 12. For example, an opening movement of door 12 (e.g., away from fuselage 18) can cause the rotation of lock shaft 64 toward the locked position, and a closing movement of door 12 (e.g., toward fuselage 18) can cause the rotation of lock shaft 64 toward the unlocked position. Interlock 62 can include arm 66 attached to lock shaft 64 and rotatable with lock shaft 64. Arm 66 can be configured as a fork including two prongs 68 each defining a cam surface. System 32 can include guide 70 attached to fuselage 18. Guide 70 can be a roller rotatably attached to fuselage 18, or other suitable means for interacting with arm 66. Guide 70 can be configured and disposed to interact with arm 66 during movement of door 12 relative to fuselage 18 in order to induce rotation of arm 66 and consequently of lock shaft 64. Guide 70 can be received between prongs 68 of arm 66 when door 12 is proximate to fuselage 18 either during an early stage of opening door 12 or during a later stage of closing door 12. Guide 70 can interact with the cam surfaces defined by prongs 68 in order to cause rotation of lock shaft 64.

Interlock 62 can be configured to interfere with relative movement between door 12 and second portion 22B of hinge 22. For example, interlock 62 can be configured to interfere with rotation of hinge links 56 when interlock 62 is in the locked configuration. Hinge links 56 can each have a first end pivotally coupled to a structure of door 12 and a second end pivotally coupled to second portion 22B of hinge 22. Interlock 62 can include one or more lock cranks 72 (referred hereinafter in the singular) attached to lock shaft 64 and rotatable with lock shaft 64. Interlock 62 can also include one or more lock links 74 (referred hereinafter in the singular). Lock link 74 can have a first end coupled to lock crank 72 and a second end coupled to hinge link 56. Accordingly lock link 74 can interfere with the rotation of hinge link 56 and thereby prevent relative movement between door 12 and second portion 22B of hinge 22 when lock shaft 64 is in the locked position.

Lock shaft 64 is shown in FIG. 6A in the unlocked position. Lock link 74 can have a piston/cylinder configuration and consequently have a length that is variable between a short length and a long length. FIG. 6B shows a configuration of system 32 where door 12 is still closed but door 12 has been moved to the lifted position by actuating handle 34. Lock shaft 64 is still in the unlocked position and the lifting of door 12 has caused second portion 22B of hinge 22 to be moved away from lock shaft 64 due to the rotation of hinge link 56. The lifting movement of door 12 relative to hinge 22 has caused lock link 74 to extend to its long length.

FIG. 6C shows a configuration of system 32 where door 12 has begun to open and has moved outwardly relative to fuselage 18. The opening movement of door 12 and the interaction of roller 70 and arm 66 has caused rotation R64 of lock shaft 64 to the locked position. Rotation R64 can cause lock link 74 to return to its short length. In this configuration, lock link 74 can be at its minimal length so that the piston/cylinder arrangement of lock link 74 has bottomed out. In this configuration, lock crank 72 and lock link 74 can be disposed and oriented to be slightly over-center relative to lock shaft 64 so that a tendency to lowering door 12 would result in hinge link 56 applying a compressive force along lock link 74 and urging further rotation R64 of lock shaft 64 beyond its locked position. However, further rotation R64 of lock shaft 64 can be prevented by way of hard stop 75 interfering with lock link 72 to prevent such further rotation R64 of lock shaft 64 beyond its locked position. One or more other hard stops can be provided (e.g., between door 12 and hinge 22) to prevent or limit movement of door 12 relative to hinge 22 when door 12 is open.

As explained above, interlock 62 can also prevent handle 34 from prematurely being returned to the door-closed position while door 12 is open. Accordingly, interlock 62 can prevent the movement of handle 34 from the door-open position to the door-closed position when interlock 62 is in the locked configuration as shown in FIG. 6C. On the other hand, interlock 62 can permit the movement of handle 34 from the door-open position to the door-closed position when interlock 62 is in the unlocked configuration as shown in FIGS. 6A and 6B. Combining two functions (e.g., locking handle 34 and lift mechanism 36) with interlock 62 can result in sharing common components of system 32 for two (or more) functions and can result in weight savings in some embodiments compared to having two completely separate mechanisms for performing the two functions.

In reference to FIGS. 4A, 4B and 6C, system 32 can include intermediate shaft 76 drivingly coupled to handle 34 via handle shaft 48, crank 78, handle link 80 and crank 82 so that actuation (e.g., rotation) of handle 34 can cause rotation of intermediate shaft 76. Intermediate shaft 76 can be rotatable about axis A6 and supported by a structure of door 12. Rotation axis A6 of intermediate shaft 76 can be different from rotation axis A5 of lock shaft 64. In some embodiments, rotation axes A5 and A6 can be substantially parallel and spaced apart from each other. Crank 78 (shown in FIG. 4A) can be attached to handle shaft 48 for common rotation with handle shaft 48. Crank 82 can be attached to intermediate shaft 76 for common rotation with intermediate shaft 76. Handle link 80 can have a first end pivotally coupled to crank 78 and a second end pivotally coupled to crank 82.

Interlock 62 can be configured to interfere with a rotation of intermediate shaft 76 when interlock 62 is in the locked configuration. For example, system 32 can include intermediate pawl 84 attached to intermediate shaft 76 for common rotation with intermediate shaft 76. System 32 can include lock pawl 86 attached to lock shaft 64 for common rotation with lock shaft 64. In the unlocked configuration of interlock 62 shown in FIGS. 6A and 6B, interlock 62 does not interfere with the rotation of intermediate shaft 76. However, in the locked configuration of interlock 62, lock pawl 86 can be oriented to interfere with rotation of intermediate pawl 84 and this can prevent rotation of intermediate shaft 76 in the direction of arrow R76 shown in FIG. 6C. Preventing the rotation of intermediate shaft 76 in this manner can prevent handle 34 from being actuated toward its door-closed position. Since lock pawl 86 is attached to lock shaft 64, the locking of handle 34 and the locking of lift mechanism 36 can be achieved substantially simultaneously and driven by movement of door 12 relative to fuselage 18 via the interaction of guide 70 and arm 66.

Figure 7:
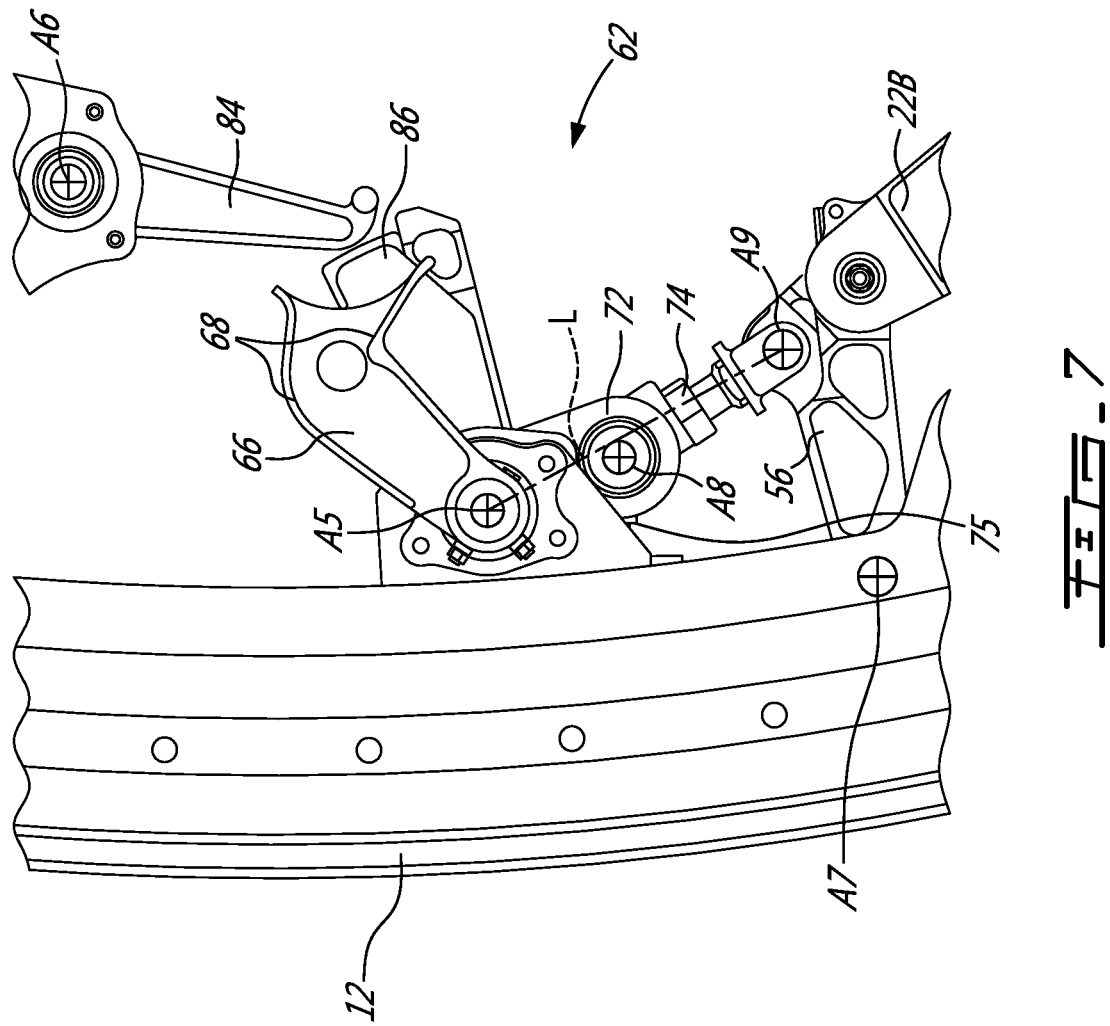
FIG. 7 is a side view of the interlock in a locked configuration where the door is lifted and partially open.

FIG. 7 is a side view of interlock 62 in the locked configuration where door 12 is lifted and partially open as shown in the situation illustrated in FIG. 6C. Lock crank 72 and lock link 74 cooperate to interfere with counter-clockwise rotation of link 56 about axis A7 and thereby prevent movement of door 12 toward its lowered position. FIG. 7 shows the over-center configuration of lock crank 72 and lock link 74 where axis A8 of relative rotation between lock crank 72 and lock link 74 is offset from line L extending from rotation axis A5 of lock shaft 64 to axis A9 of relative rotation between hinge link 56 and lock link 74.

FIG. 8 is a flowchart of method 100 for operating aircraft door 12. Method 100 can be performed using system 32 described herein or another system. Aspects of method 100 can be combined with other methods or steps disclosed herein. Method 100 can be conducted during an early stage of opening door 12. In various embodiments, method 100 comprises:

causing a lifting movement of door 12 relative to hinge 22 from a lowered position toward a lifted position to permit opening of the aircraft door (see block 102); and configuring interlock 62 to a locked configuration where the lowering movement of door 12 from the lifted position to the lowered position is prevented (see block 104).

Method 100 can comprise using a movement of handle 34 toward a door-open position to cause the lifting movement of door 12. Interlock 62 can prevent the movement of handle 34 toward the door-closed position when interlock 62 is in the locked configuration. Interlock 62 can permit movement of handle 34 toward the door-closed position when interlock 62 is in the unlocked configuration.

Method 100 can comprise using an opening movement of door 12 to configure interlock 62 between the unlocked configuration and the locked configuration.

Method 100 can further comprise configuring interlock 62 from the locked configuration to the unlocked configuration.

Method 100 can comprise configuring interlock 62 from the locked configuration to the unlocked configuration where the movement of door 12 from the lifted position toward the lowered position relative to hinge 22 is permitted. Method 100 can comprise using the movement of handle 34 toward the door-closed position to cause a lowering movement of door 12 relative to hinge 22 from the lifted position toward the lowered position.

Method 100 can comprise using a closing movement of door 12 to configure interlock 62 from the locked configuration to the unlocked configuration. Method 100 can comprise using guide 70 attached to fuselage 18 to configure interlock 62. Method 100 can comprise using guide 70 to cause the rotation of lock shaft 64 of interlock 62.

Interlock 62 can interfere with the rotation of a shaft drivingly coupled to handle 34 when interlock 62 is in the locked configuration. For example, interlock 62 can interfere with the rotation of intermediate shaft 76 when interlock 62 is in the locked configuration.

FIG. 9 is a flowchart of method 200 for operating aircraft door 12. Method 200 can be performed using system 32 described herein or another system. Aspects of method 200 can be combined with other methods or steps disclosed herein. Method 200 can be conducted during a later stage of closing door 12. In various embodiments, method 200 comprises:

configuring interlock 62 from the locked configuration to the unlocked configuration (see block 202); and then causing the lowering movement of door 12 relative to hinge 22 from the lifted position toward the lowered position (see block 204).

Method 200 can comprise using a movement of handle 34 toward the door-closed position to cause the lowering movement of door 12.

Interlock 62 can prevent the movement of handle 34 toward the door-closed position when interlock 62 is in the locked configuration. Interlock 62 can permit the movement of handle 34 toward the door-closed position when interlock 62 is in the unlocked configuration.

Method 200 can comprise using the closing movement of door 12 to configure interlock 62 from the locked configuration to the unlocked configuration. Method 200 can comprise using guide 70 attached to fuselage 18 to configure interlock 62. Method 200 can comprise using guide 70 to cause the rotation of lock shaft 64 of interlock 62.

FIG. 10 is a flowchart of method 300 for operating aircraft door 12. Method 300 can be performed using system 32 described herein or another system. Aspects of method 300 can be combined with other methods or steps disclosed herein. In various embodiments, method 300 comprises:

after the movement of handle 34 from the door-closed position toward the door-open position, using the opening movement of door 12 relative to fuselage 18 to configure interlock 62 from the unlocked configuration where the movement of handle 34 toward the door-closed position is permitted, to the locked configuration where the movement of handle 34 toward the door-closed position is prevented (see block 302).

Method 300 can comprise using the closing movement of door 12 relative to fuselage 18 to configure interlock 62 from the locked configuration to the unlocked configuration (see block 304).

Method 300 can comprise using guide 70 attached to fuselage 18 to configure interlock 62 between the unlocked configuration and the locked configuration.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A system for operating an aircraft door including an airstair, the system comprising:
a hinge configured to pivotally couple a lower portion of the aircraft door to a fuselage of an aircraft;
a lift mechanism operatively coupled to cause a movement of the aircraft door relative to the hinge between a lowered position where opening and closing of the aircraft door is prevented and a lifted position were opening and closing of the aircraft door is permitted;
an interlock configurable between: a locked configuration where the movement of the aircraft door from the lifted position toward the lowered position relative to the hinge is prevented; and an unlocked configuration where the movement of the aircraft door from the lifted position toward the lowered position relative to the hinge is permitted; and
wherein:
the interlock includes a lock shaft rotatably supported on the aircraft door;
the lock shaft is rotatable between a locked position corresponding to the locked configuration of the interlock and an unlocked position corresponding to the unlocked configuration of the interlock; and
a rotation of the lock shaft is driven by a movement of the aircraft door relative to the fuselage.

2. The system as defined in claim 1, comprising a handle drivingly coupled to the lift mechanism so that:
a movement of the handle toward a door-open position causes a movement of the aircraft door toward the lifted position; and
a movement of the handle toward a door-closed position causes a movement of the aircraft door toward the lowered position.

3. The system as defined in claim 2, wherein:
the interlock prevents the movement of the handle toward the door-closed position when the interlock is in the locked configuration; and
the interlock permits the movement of the handle toward the door-closed position when the interlock is in the unlocked configuration.

4. The system as defined in claim 2, comprising:
a rotatable handle shaft drivingly coupled to the handle so that a movement of the handle causes a rotation of the handle shaft;
a rotatable lift shaft rotatably supported on the aircraft door and drivingly coupled to the handle shaft so that the rotation of the handle shaft causes a rotation of the lift shaft; and
one or more lift rods drivingly coupled to the lift shaft and to the hinge so that a rotation of the lift shaft causes the movement of the aircraft door relative to the hinge via the lift rods.

5. The system as defined in claim 2, comprising an intermediate shaft drivingly coupled to the handle, the interlock interfering with a rotation of the intermediate shaft when the interlock is in the locked configuration.

6. The system as defined in claim 5, comprising:
an intermediate pawl attached to the intermediate shaft and rotatable with the intermediate shaft; and
a lock pawl attached to the lock shaft and rotatable with the lock shaft, the lock pawl interfering with a rotation of the intermediate pawl when the interlock is in the locked configuration.

7. The system as defined in claim 1, wherein:
an opening movement of the aircraft door causes the rotation of the lock shaft toward the locked position; and
a closing movement of the aircraft door causes the rotation of the lock shaft toward the unlocked position.

8. The system as defined in claim 7, comprising:
an arm attached to the lock shaft and rotatable with the lock shaft; and
a guide attached to the fuselage, the guide being configured and disposed to interact with the arm during movement of the aircraft door relative to the fuselage and cause a rotation of the arm.

9. The system as defined in claim 8, wherein:
the arm defines a cam surface; and
the guide includes a roller configured to interact with the cam surface of the arm.

10. The system as defined in claim 1, wherein:
the hinge is pivotally coupled to a hinge link;
the hinge link is pivotally coupled to the aircraft door, and the system comprises:
a lock crank attached to the lock shaft and rotatable with the lock shaft; and
a lock link having a first end coupled to the lock crank and a second end coupled to the hinge link so that a rotation of the hinge link is prevented when the lock shaft is in the locked position.

11. The system as defined in claim 10, wherein:
the lock link has a length variable between a short length and a long length; and
the lock link has the short length when the lock shaft is in the locked position.

12. The system as defined in claim 1, wherein:
the hinge is pivotally coupled to a hinge link;
the hinge link is pivotally coupled to the aircraft door; and
the interlock interferes with a movement of the hinge link when the interlock is in the locked configuration.

13. The system as defined in claim 1, wherein the interlock is configurable between the unlocked and locked configurations in response to a movement of the aircraft door relative to the fuselage.

14. A system for operating an aircraft door including an airstair, the system comprising:
a hinge configured to pivotally couple a lower portion of the aircraft door to a fuselage of an aircraft;
a handle configured to facilitate an opening of the aircraft door, the handle being movable between a door-closed position and a door-open position; and
an interlock configurable between an unlocked configuration and a locked configuration in response to a movement of the aircraft door relative to the fuselage, wherein:
a movement of the handle toward the door-closed position is permitted when the interlock is in the unlocked configuration;
the movement of the handle toward the door-closed position is prevented when the interlock is in the locked configuration; and
wherein:
the interlock includes a lock shaft rotatably supported on the aircraft door;

the lock shaft is rotatable between a locked position corresponding to the locked configuration of the interlock and an unlocked position corresponding to the unlocked configuration of the interlock; and a rotation of the lock shaft is driven by the movement of the aircraft door relative to the fuselage.

15. The system as defined in claim 14, wherein an opening movement of the aircraft door causes the rotation of the lock shaft toward the locked position.

16. The system as defined in claim 15, comprising:
an arm attached to the lock shaft and rotatable with the lock shaft; and
a guide attached to the fuselage, the guide being configured and disposed to interact with the arm during movement of the aircraft door relative to the fuselage and cause a rotation of the arm.

17. The system as defined in claim 16, wherein:
the arm defines a cam surface; and
the guide includes a roller configured to interact with the cam surface of the arm.

18. The system as defined in claim 14, comprising:
a handle shaft drivingly coupled to the handle; and
an intermediate shaft drivingly coupled to the handle shaft, wherein
the interlock interferes with a rotation of the intermediate shaft when the interlock is in the locked configuration.

* * * * *